US012217645B2

(12) United States Patent
Kim et al.

(10) Patent No.: US 12,217,645 B2
(45) Date of Patent: Feb. 4, 2025

(54) CALIBRATION SYSTEM FOR DISPLAY APPARATUS AND OPERATING METHOD THEREOF

(71) Applicants: SAMSUNG ELECTRONICS CO., LTD., Suwon-si (KR); CHUNG ANG University Industry Academic Cooperation Foundation, Seoul (KR)

(72) Inventors: Unjeong Kim, Suwon-si (KR); Hojung Kim, Suwon-si (KR); Hyungbin Son, Seoul (KR); Suyeon Lee, Seoul (KR)

(73) Assignees: SAMSUNG ELECTRONICS CO., LTD., Suwon-si (KR); CHUNG ANG University Industry Academic Cooperation Foundation, Seoul (KR)

( * ) Notice: Subject to any disclaimer, the term of this patent is extended or adjusted under 35 U.S.C. 154(b) by 0 days.

(21) Appl. No.: 18/136,630

(22) Filed: Apr. 19, 2023

(65) Prior Publication Data
US 2024/0071275 A1 Feb. 29, 2024

(30) Foreign Application Priority Data
Aug. 26, 2022 (KR) .................. 10-2022-0107907

(51) Int. Cl.
*G09G 3/20* (2006.01)
*G06T 7/90* (2017.01)
(52) U.S. Cl.
CPC ............ *G09G 3/2003* (2013.01); *G06T 7/90* (2017.01); *G06T 2207/10024* (2013.01); *G09G 2320/0666* (2013.01); *G09G 2360/144* (2013.01)
(58) Field of Classification Search
CPC . G01N 21/25; G06T 7/90; G06T 2207/10024; G09G 3/2003
(Continued)

(56) References Cited
U.S. PATENT DOCUMENTS
2013/0050504 A1   2/2013  Safaee-Rad et al.
2014/0176948 A1   6/2014  Holub
(Continued)

FOREIGN PATENT DOCUMENTS
KR   10-2014-0054326 A   5/2014
KR   10-2014-0094161 A   7/2014
(Continued)

OTHER PUBLICATIONS
Nicholas Di Giovanni, "Our Monitor Picture Quality Tests", Color Accuracy, RTINGS, Nov. 21, 2022, 9 pages, https://www.rtings.com/monitor/tests/picture-quality/color-accuracy.
(Continued)

*Primary Examiner* — Calvin C Ma
(74) *Attorney, Agent, or Firm* — Sughrue Mion, PLLC

(57) ABSTRACT

An operating method of a calibration system for a display device obtains image information about an image displayed on display device and wavelength information about pixels of the image information using a hyperspectral camera included in an electronic device, transmits the obtained image information and wavelength information to a first application in the electronic device, generates calibration data about the obtained image information and wavelength information through the first application and transmits the calibration data to a second application in the display device, and performs color calibration of the display device based on the calibration data transmitted to the second application to display a color calibrated image.

20 Claims, 9 Drawing Sheets

(58) Field of Classification Search
USPC .......................................................... 345/690
See application file for complete search history.

(56) References Cited

U.S. PATENT DOCUMENTS

| | | |
|---|---|---|
| 2019/0373206 A1 | 12/2019 | Kang et al. |
| 2020/0088579 A1* | 3/2020 | Balas .................... G01J 3/2823 |
| 2020/0264046 A1* | 8/2020 | Constantin ............ G01J 3/0297 |
| 2021/0025755 A1 | 1/2021 | Knobbe et al. |
| 2021/0049942 A1* | 2/2021 | Bai .................... G02B 27/0172 |
| 2022/0086409 A1 | 3/2022 | Park et al. |

FOREIGN PATENT DOCUMENTS

| | | |
|---|---|---|
| KR | 10-2018-0061792 A | 6/2018 |
| KR | 10-2019-0138560 A | 12/2019 |
| KR | 10-2021-0034279 A | 3/2021 |
| KR | 10-2022-0027012 A | 3/2022 |

OTHER PUBLICATIONS

Office Action issued Mar. 21, 2024 by the Korean Patent Office for KR Patent Application No. 10-2022-0107907.

* cited by examiner

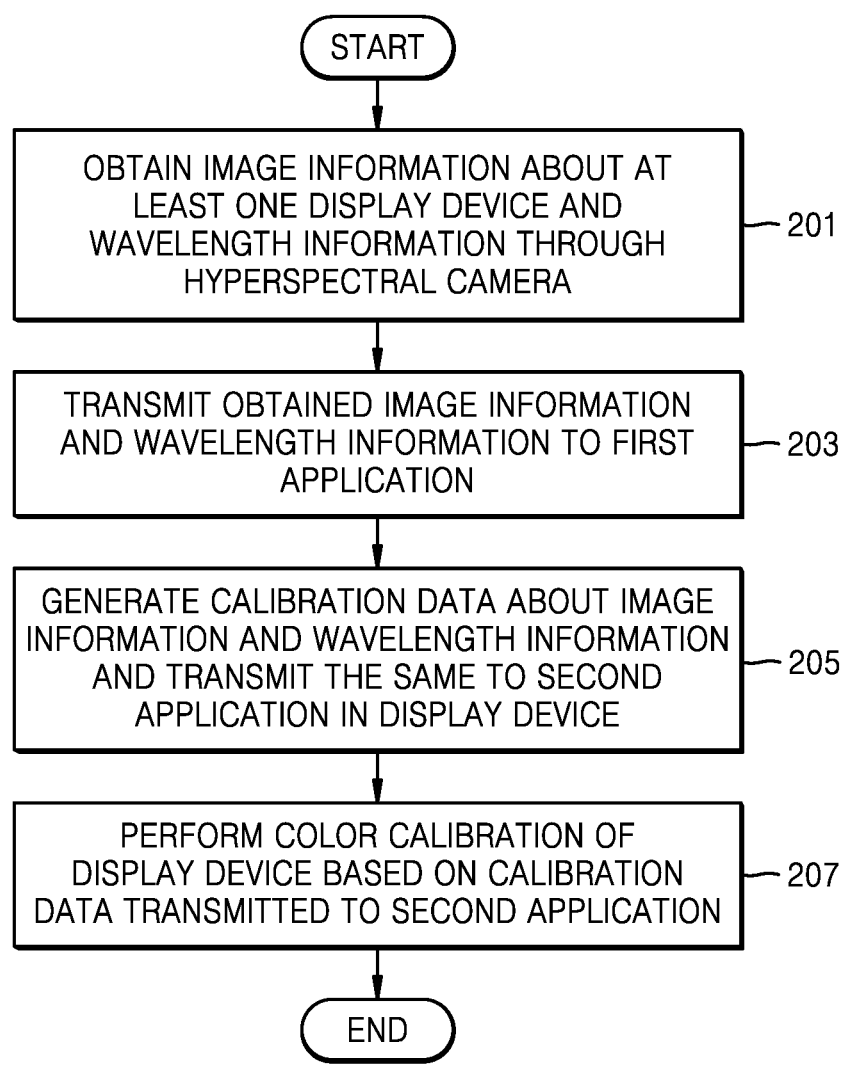

CALIBRATION SYSTEM FOR DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2022-0107907, filed on Aug. 26, 2022, in the Korean Intellectual Property Office, the disclosure of which is incorporated by reference herein in its entirety.

BACKGROUND

1. Field

Apparatus and methods consistent with the present disclosure relate to a system for calibrating a display device based on calibration data generated by a hyperspectral camera, and an operating method of the system.

2. Description of Related Art

A monitor is a device for converting a digital signal into an image and displaying the image to be recognized by the human eye. A monitor displaying accurate colors, having proper brightness, or the like is important for its use in digital photography, video operations, print operations, or similar areas. This is especially true in professional applications. However, because the color reproduction degree of a monitor varies with the manufacturer, model, or the like, it is necessary to periodically perform a color calibration operation through a separate calibration device.

In general, a color management system (CMS) is used to match colors between devices. More specifically, color calibration is performed on a monitor by using an optical device. A probe of the optical device may be connected to a computer through a universal serial bus (USB). The probe may be placed in close contact with an area displayed on the monitor display, and the optical device may perform a color calibration operation on the monitor based on a measurement value of the probe.

SUMMARY

Recently, the number of general users performing photo and video operations has also increased, increasing the number of users (general and professional) using monitors for photography and video operations. For all users, the need fora separate optical device for color calibration may be relatively expensive and may not be easy to carry.

Example embodiments consistent with this disclosure are a system for performing correction on a display device based on calibration data generated through a hyperspectral camera, and an operating method thereof.

Technical problems to be solved by example embodiments of the disclosure are not limited to that described above. Solutions for other technical problems may be derived from the example embodiments.

Additional aspects will be set forth in part in the description which follows and, in part, will be apparent from the description, or may be learned by practice of example embodiments of the disclosure.

According to an embodiment, an operating method of a calibration system for a display device, the operating method may include: obtaining image information of an image displayed on a screen of the display device; obtaining wavelength information about pixels of the image information using a hyperspectral camera included in an electronic device; transmitting the obtained image information and wavelength information to a first application in the electronic device; generating calibration data about the obtained image information and wavelength information through the first application and transmitting the calibration data to a second application in the display device; and performing color calibration of the display device based on the calibration data transmitted to the second application to provide a color calibrated output image on the display device.

According to an embodiment, the first application of the electronic device may generate calibration data by measuring at least one of color gamut and color fidelity based on the obtained image information and wavelength information.

According to an embodiment, the first application of the electronic device may generate calibration data by further measuring at least one of white balance, corrected color temperature, brightness, and gamma.

According to an embodiment, the method may further include obtaining ambient light data of the display device through the hyperspectral camera, wherein the display device outputs color calibrated output image further adjusted for the ambient light.

According to an embodiment, the method may further include transmitting the obtained ambient light data to the first application in the electronic device; generating first calibration data about the ambient light data and second calibration data about the obtained image information and wavelength information through the first application; and transmitting the first calibration data and the second calibration data to the second application.

According to an embodiment, obtaining of the image information may comprise setting autofocus on a certain area of the display device through the hyperspectral camera.

According to an embodiment, the method may further comprise obtaining a plurality of pieces of image information and wavelength information about a plurality of display devices through the hyperspectral camera; and generating a plurality of pieces of calibration data respectively corresponding to the plurality of display devices by analyzing the plurality of pieces of image information and wavelength information through the first application.

According to an embodiment, the first application of the electronic device and the second application of the display device may each establish a wireless communication connection through a server.

According to an embodiment, generating the calibration data may include generating a hyperspectral cube having a plurality of channel information at each spatial coordinate of respective pixels of the image information, and the plurality of channel information corresponds to the wavelength information of the pixels of the image information at respective spatial coordinates of the image information.

According to an embodiment, the hyperspectral camera may obtain the wavelength information and a general camera may obtain the image information.

According to an embodiment, a calibration system fora display device, the calibration system may include: an electronic device comprising a hyperspectral camera; and a display device, According to an embodiment, a calibration system for a display device, the calibration system may include: an electronic device comprising a hyperspectral camera; and a display device, wherein the electronic device is includes a processor, and the processor is configured to obtain image information about an image displayed on the display device; obtain wavelength information about pixels of the image information through the hyperspectral camera, transmit the obtained image information and wavelength information to a first application, and generate calibration data about the obtained image information and wavelength information through the first application and transmits the calibration data to a second application in the display device, and the display device is configured to perform color calibration of the display device based on the calibration data transmitted to the second application to provide a color calibrated output image on the display device.

According to an embodiment, the first application of the electronic device may generate calibration data by measuring at least one of color gamut and color fidelity based on the obtained image information and wavelength information.

According to an embodiment, the first application of the electronic device may further generate calibration data by further measuring at least one of white balance, corrected color temperature, brightness, and gamma.

According to an embodiment, the electronic device may further obtain ambient light data of the display device through the hyperspectral camera, and the display device outputs color calibrated output image further adjusted based on the ambient light.

According to an embodiment, the electronic device may further transmit the obtained ambient light data to the first application, generate first calibration data about the ambient light data and second calibration data about the obtained image information and wavelength information through the first application, and transmit the first calibration data and the second calibration data to the second application.

According to an embodiment, the electronic device may further set autofocus on a certain area of the display device through the hyperspectral camera.

According to an embodiment, the electronic device may further obtain a plurality of pieces of image information and wavelength information about a plurality of display devices through the hyperspectral camera, and generate a plurality of pieces of calibration data respectively corresponding to the plurality of display devices by analyzing the plurality of pieces of image information and wavelength information through the first application.

According to an embodiment, the first application of the electronic device and the second application of the display device may each establish a wireless communication connection through a server.

According to an embodiment, the processor may generate the calibration data by generating a hyperspectral cube having a plurality of channel information at each spatial coordinate of respective pixels of the image information, and the plurality of channel information corresponds to the wavelength information of the pixels of the image information at respective spatial coordinates of the image information.

According to an embodiment, a non-transitory computer-readable recording medium having recorded thereon a program for executing the operating method in a computer.

BRIEF DESCRIPTION OF THE DRAWINGS

The above and other aspects, features, and advantages of example embodiments of the disclosure will be more apparent from the following description taken in conjunction with the accompanying drawings, in which:

FIG. 2 is a flowchart for describing an operating method of a calibration system according to an embodiment;

DETAILED DESCRIPTION

Figure 1:
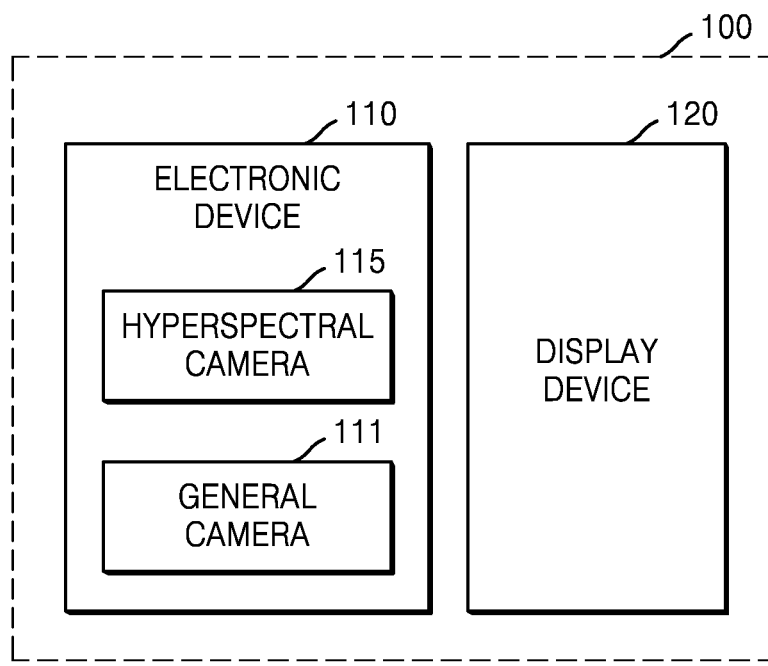
FIG. 1 is a block diagram of a calibration system for a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used herein are those general terms currently widely used in the art in consideration of functions in regard to the disclosure, but the terms may vary according to the intentions of those of ordinary skill in the art, precedents, or new technology in the art. Also, in some cases, there may be terms that are optionally used, and the meanings thereof will be described in detail in the corresponding portions of the description of the embodiment. To the extent such optional terms used herein are not simple terms, the optional terms should be defined based on the meanings thereof in the context of the overall description of example embodiments.

In the descriptions of embodiments, when an element is referred to as being "connected" to another element, it may be "directly connected" to the other element or may be "electrically connected" to the other element with one or more intervening elements therebetween. As used herein, the singular forms "a", "an", and "the" are intended to include the plural forms as well, unless the context clearly indicates otherwise. Also, when something is referred to as "including" a component, another component may be further included unless specified otherwise.

The term such as "comprise" or "include" used herein should not be construed as necessarily including all of the elements or operations described by example embodiments. The use of the term "comprise" and "include" should be construed as allowing for additional elements and operations as well as those elements specifically listed.

Also, although terms including ordinals such as "first" or "second" may be used herein to describe various elements, these elements should not be limited by these terms. These terms are only used to distinguish one element or component from another element or component.

The following description of embodiments should not be construed as limiting the scope of the disclosure. Modifications of example embodiments may be easily inferred by those of ordinary skill in the art should be construed as being included in the scope of the embodiments. Hereinafter, embodiments will be described in detail merely as examples with reference to the accompanying drawings.

FIG. 1 is a block diagram of a calibration system for a display device according to an embodiment.

Referring to FIG. 1, a calibration system 100 may include an electronic device 110 and a display device 120, and the electronic device 110 may include a hyperspectral camera 115. It will be apparent to those of ordinary skill in the art that the calibration system 100 may further include other general-purpose components in addition to the components illustrated in FIG. 1. For example, the electronic device 110 of the calibration system 100 may further include hardware components such as a processor, a memory, a battery, and a communication module.

The electronic device 110 may correspond to any device capable of obtaining an image of an object through the hyperspectral camera 115. For example, the electronic device 110 may be a smart phone provided with the hyperspectral camera 115, and the smart phone may simultaneously obtain image information and wavelength information about each pixel through the hyperspectral camera 115. Here, each pixel may correspond to pixels of image information used to perform calibration. This may include a subset of pixels of an entire image displayed on the monitor of a display device or all of the pixels of the image displayed on the monitor of the display device.

In an embodiment, the electronic device 110 may obtain image information about the display device 120 and wavelength information about each pixel of image information through the hyperspectral camera 115. For example, the electronic device 110 may photograph the display device 120 through the hyperspectral camera 115. This may simultaneously obtain image information about an image displayed on the screen of the display device 120 and wavelength information about each pixel corresponding to the image information through the hyperspectral camera 115.

The hyperspectral camera 115 may obtain information by a spatial scanning method (e.g., whisk-broom) or a spectrum scanning method (e.g., push-broom). For example, in the case of a whisk-broom method, the hyperspectral camera 115 may obtain image information and wavelength information about each pixel while moving along x-y spatial coordinates while detecting radiation of a certain spectral region over multiple channels. As another example, in the case of a push-broom method, the hyperspectral camera 115 may obtain image information and wavelength information about each pixel while moving a line sensor, with sensors disposed in an x-direction, along the y axis.

In an embodiment, the electronic device 110 may transmit image information about the display device 120 and wavelength information about each pixel to a first application. For example, when the electronic device 110 obtains image information about the display device 120 and wavelength information about each pixel, the electronic device 110 may automatically or manually transmit the information to the first application. In this case, the "first application" may be an application pre-installed in the electronic device 110 and may refer to an application for color calibration of the display device 120.

In another embodiment, the electronic device 110 may obtain image information about the display device 120 and wavelength information about each pixel by activating a camera function in the first application. For example, when the camera function in the first application is activated after the first application is executed, at least one camera (e.g., hyperspectral camera) among a plurality of cameras included in the electronic device 110 may be activated.

In an embodiment, the electronic device 110 may generate calibration data about the image information and the wavelength information through the first application. For example, the first application may generate calibration data by measuring at least one of color gamut and color fidelity based on the image information and wavelength information obtained through the hyperspectral camera 115 of the electronic device 110. However, the disclosure is not limited thereto, and the electronic device 110 may generate calibration data by further measuring white balance, corrected color temperature, brightness, gamma, and/or the like.

In this case, the 'color gamut' may have the same meaning as "color reproduction rate" or "gamut" and may refer to a value expressed as a percentage based on a color standard such as sRGB, Adobe RGB, or DCI-P3, as a numerical value indicating how much the color of an original image can be expressed on the screen of the display device 120.

Also, the "gamma" may refer to a numerical value that determines the correlation between the gray level of a signal input to the display device 120 and the luminance of an image displayed on the monitor screen of the display device 120.

In an embodiment, the first application may generate calibration data by comparing a value measured based on the obtained image information and wavelength information with a preset standard value. For example, when a color gamut value measured based on the obtained image information and the wavelength information is 98.5% and a preset standard color gamut value is 100.5%, the first application may generate calibration data such as "+2%" for a color gamut item. As another example, when a gamma value measured based on the obtained image information and wavelength information is 2.1, a color temperature value is 6,680 K, a brightness value is 149 cd/m$^2$, and a preset standard gamma value, a color temperature value, and a brightness value are 2.2, 6,500 K, and 120 cd/m$^2$ respectively, the first application may generate calibration data such as "+0.1", "−180 K", and "−29 cd/m$^2$" for a gamma item, a color temperature item, and a brightness item respectively.

In an embodiment, the electronic device 110 may generate a hyperspectral cube for the display device 120 based on the obtained image information and wavelength information, compress the generated hyperspectral cube, and transmit the result thereof to the first application. In an example embodiment, a wavelength band measured through the hyperspectral camera 115 may be a VIS region (about 400 nm to about 700 nm), and the number of wavelength bands may be about 10 to about 100.

For example, the hyperspectral cube generated by the electronic device 110 may include wavelength information of a high capacity of tens of channels to hundreds of channels with respect to one piece of image information. For example, the hyperspectral cube may include tens or hundreds of channels of wavelength information for a pixel at a particular spatial coordinate of the image. Accordingly, the electronic device 110 may compress data represented in the hyperspectral cube through any one of lossy compression, lossless compression, and hybrid compression and transmit the result thereof to the first application.

In an embodiment, the electronic device 110 may transmit the calibration data generated by the first application to a second application in the display device 120. In this case, the "second application" may be an application pre-installed in the display device 120 and may refer to an application for color calibration of the display device 120.

For example, the first application of the electronic device 110 and the second application of the display device 120 may establish a wireless communication connection through a separate server. Details thereof will be described below with reference to FIG. 3A.

The display device 120 may be any device that outputs a digital signal in the form of an image to be recognized by the user. For example, the display device 120 may refer to a device such as a monitor or a television (TV) connected to a personal computer (PC); however, the disclosure is not limited thereto.

In an embodiment, the display device 120 may include at least one display module, and the display module may include one of various types of display panels. For example, the display module included in the display device 120 may include at least one of a liquid crystal display (LCD) panel and a light emitting diode (LED) panel. More particularly, the LCD panel may include an in-plane switching (IPS) panel, a twisted nematic (TN) panel, a vertical alignment (VA) panel, or the like, and the LED panel may include an organic LED (OLED) panel, an active-matrix OLED (AMOLED) panel, a passive-matrix OLED (PMOLED), or the like.

In an embodiment, the display device 120 may perform color calibration on the display panel through a separate processor. For example, when the display device 120 receives the calibration data from the electronic device 110 through the second application, the processor of the display device 120 may perform color calibration on the display panel based on the received calibration data.

FIG. 2 is a flowchart for describing an operating method of a calibration system according to an embodiment.

FIG. 2 illustrates operations performed by an electronic device (e.g., the electronic device 110 of FIG. 1) and a display device (e.g., the display device 120 of FIG. 1) included in a calibration system (e.g., the calibration system 100 of FIG. 1).

Referring to FIG. 2, in operation 201, the electronic device 110 of the calibration system 100 may obtain image information about the display device 120 and wavelength information about each pixel through a hyperspectral camera (e.g., the hyperspectral camera 115 of FIG. 1).

In an embodiment, the display device 120 may display an image in which a plurality of images including a single color appear continuously or may display only a single image including a plurality of colors; however, the disclosure is not limited thereto.

In an embodiment, when a particular application (e.g., a camera application or a color calibration application) is executed, the electronic device 110 may activate the hyperspectral camera 115. For example, when a camera application pre-installed in the electronic device 110 is executed, the electronic device 110 may activate the hyperspectral camera 115. As another example, when a color calibration application pre-installed in the electronic device 110 is executed, the electronic device 110 may activate the hyperspectral camera 115.

As another example, when a camera application pre-installed in the electronic device 110 is executed and image information about the display device 120 (e.g., image information from which display panel information is extracted) is included in image information obtained through a general camera 111 of the electronic device 110 (e.g., a camera that does not obtain wavelength information), the electronic device 110 may activate the hyperspectral camera 115.

In an embodiment, the electronic device 110 may generate a hyperspectral cube by obtaining image information output from the display device 120 and wavelength information about each pixel in the image information. For example, in the image information, each pixel may include a continuous spectrum that may be used to extract a feature value from the pixel, and the hyperspectral cube may refer to three-dimensional data including a combination of image information that is two-dimensional spatial information and wavelength information that is continuous spectrum information.

According to an embodiment, in operation 203, the electronic device 110 of the calibration system 100 may transmit the image information and the wavelength information to the first application in the electronic device 110.

In an embodiment, when the electronic device 110 obtains image information about the display device 120 and wavelength information about each pixel, the electronic device 110 may automatically or manually transmit the obtained information to the first application. In this case, the "first application" may be an application pre-installed in the electronic device 110 and may refer to an application for color calibration of the display device 120.

For example, the electronic device 110 may obtain image information about the display device 120 and wavelength information about each pixel by activating the hyperspectral camera 115 through a separate application (e.g., a camera application). In this case, the electronic device 110 may transmit the obtained information to a server for the first application. The electronic device 110 may transmit the obtained information to the server based on a separate user input or may automatically transmit the obtained information to the server as the information is obtained.

As another example, the electronic device 110 may obtain image information about the display device 120 and wavelength information about each pixel by activating the hyperspectral camera 115 through the first application (e.g., a color calibration application). In this case, the electronic device 110 may transmit the obtained information to a server for the first application. The electronic device 110 may transmit the obtained information to the server based on a user input in the first application or may automatically transmit the obtained information to the server as the information is obtained.

According to an embodiment, in operation 205, the electronic device 110 of the calibration system 100 may generate calibration data about the image information and wavelength information obtained through the first application and transmit the calibration data to the second application in the display device 120.

In an embodiment, the electronic device 110 may calculate a measurement value through the first application based on the obtained image information and wavelength information.

Through the first application, the electronic device 110 may calculate a color gamut value, a gamma value, a color temperature value, a brightness value, a color fidelity value, a white balance value, and/or the like based on the wavelength information about each pixel included in the image information. For example, through the first application, the electronic device 110 may calculate a color gamut value of 98.5%, a gamma value of 2.1, a color temperature value of 6,680 K, and a brightness value of 149 cd/m² of the display screen of the display device 120 photographed (captured) through the hyperspectral camera 115.

In an embodiment, the electronic device 110 may generate calibration data by comparing the measurement value calculated through the first application with a preset standard value. In this case, the "preset standard value" may refer to a standard value adjusted by the user in relation to display color calibration of the display device 120, a finally set standard value (e.g., a value set one month ago), or a standard value preset by the manufacturer; however, the disclosure is not limited thereto.

The electronic device 110 may generate calibration data by comparing a plurality of measurement values calculated through the first application with preset standard values respectively. For example, a preset standard value for the display screen of the display device 120 may include a color gamut value of 100.5%, a gamma value of 2.2, a color temperature value of 6,500 K, and a brightness value of 120 cd/m², and the electronic device 110 may generate calculation data such as "+2%", "+0.1", "−180 K", and "−29 cd/m²" for a color gamut item, a gamma item, a color temperature item, and a brightness item respectively by comparing the measurement value calculated through the first application with the preset standard value.

According to an embodiment, in operation 207, the display device 120 of the calibration system 100 may perform color calibration of the display device 120 based on the calibration data transmitted to the second application.

In an embodiment, the display device 120 may receive the calibration data generated by the first application through the second application. In this case, the "second application" may be an application pre-installed in the display device 120 and may refer to an application for color calibration of the display device 120. For example, the second application of the display device 120 may establish a wireless communication connection with the first application pre-installed in the electronic device 110 through a separate server, and the calibration data generated by the first application may be transmitted to the second application through the separate server.

In an embodiment, the display device 120 may perform color calibration on the display panel based on the received calibration data. For example, a separate processor included in the display device 120 may adjust a display setting value based on calibration data of "+2%", "+0.1", "−180 K", and "−29 cd/m²" for a color gamut item, a gamma item, a color temperature item, and a brightness item received by the second application.

Figure 3A:
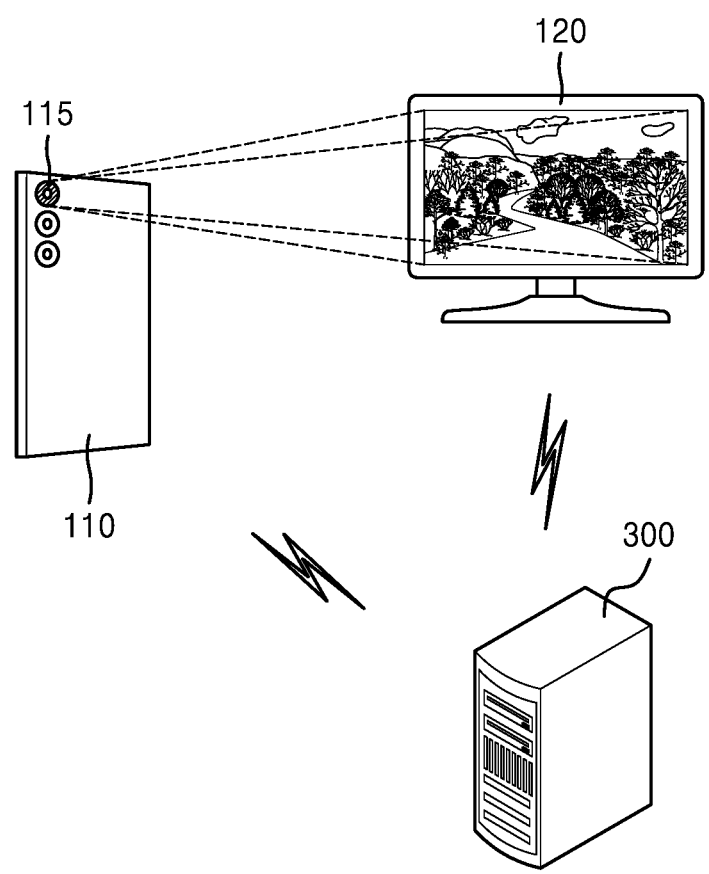
FIG. 3A is a conceptual diagram illustrating an operation of the calibration system of FIG. 1.

FIG. 3A is a conceptual diagram illustrating an operation of the calibration system of FIG. 1.

Referring to FIG. 3A, the electronic device 110 including the hyperspectral camera 115 and the display device 120 may establish a wireless communication connection through a separate server 300.

In an embodiment, the electronic device 110 may activate the hyperspectral camera 115 as a particular application is executed. In this case, the particular application may be a camera application in which a general camera 111 is activated or may be a color calibration application for color calibration of the display device 120.

For example, when the particular application is a camera application, the electronic device 110 may perform an operation of activating the general camera 111 and an operation of activating the hyperspectral camera 115 as the camera application is executed in parallel.

As another example, when the particular application is a camera application, the electronic device 110 may sequentially perform an operation of activating the general camera as the camera application is executed and an operation of activating the hyperspectral camera 115 as a separate user input is received.

As another example, when the particular application is a color calibration application, the electronic device 110 may perform an operation of activating the hyperspectral camera 115, and in this case, an operation of activating the general camera may be omitted. However, the disclosure is not limited thereto, and, the electronic device 110 may perform an operation of activating the general camera, together with an operation of activating the hyperspectral camera 115, in order to obtain separate image information.

In an embodiment, the electronic device 110 may obtain (capture) image information displayed on the display device 120 when the display device 120 is located within the field-of-view (FOV) of the hyperspectral camera 115. For example, when at least a portion of the display device 120 is located within the FOV photographed (captured) by the hyperspectral camera 115, the electronic device 110 may obtain image information and wavelength information about each pixel by capturing image information displayed on the portion of the display device 120 within the field of view.

In an embodiment, the electronic device 110 may calculate the current color information of the panel of the display device 120 through the color calibration application (the first application) based on the obtained image information and wavelength information about each pixel. For example, the first application may calculate the current color gamut value, gamma value, brightness value, color fidelity value, color temperature value, and/or the like of the panel of the display device 120 from the hyperspectral cube obtained through the hyperspectral camera 115.

In an embodiment, the electronic device 110 may transmit at least one of the obtained image information, the obtained wavelength information about each pixel, and the current color information of the panel of the display device 120 to the server 300 connected to the color calibration application pre-installed in the electronic device 110. In this case, the server 300 may include a separate database storing a preset standard value for the panel of the display device 120. For example, the server 300 may store, in the separate database, a standard value adjusted by the user, a finally set standard value, or a standard value preset by the manufacturer for the panel of the display device 120.

In an embodiment, the electronic device 110 may receive the preset standard value for the panel of the display device 120 from the server 300 connected to the color calibration application. The electronic device 110 may generate calibration data by comparing the received preset standard value with the value calculated through the color calibration application (the first application) and transmit the generated calibration data to the server 300.

In an embodiment, the server 300 may transmit the generated calibration data to the display device 120 through the color calibration application (the first application). In this case, the display device 120 may receive the calibration data through the color calibration application (the second application) pre-installed in the display device 120. Thereafter, the display device 120 may perform color calibration on the panel of the display device 120 based on the received calibration data.

Figure 3B:
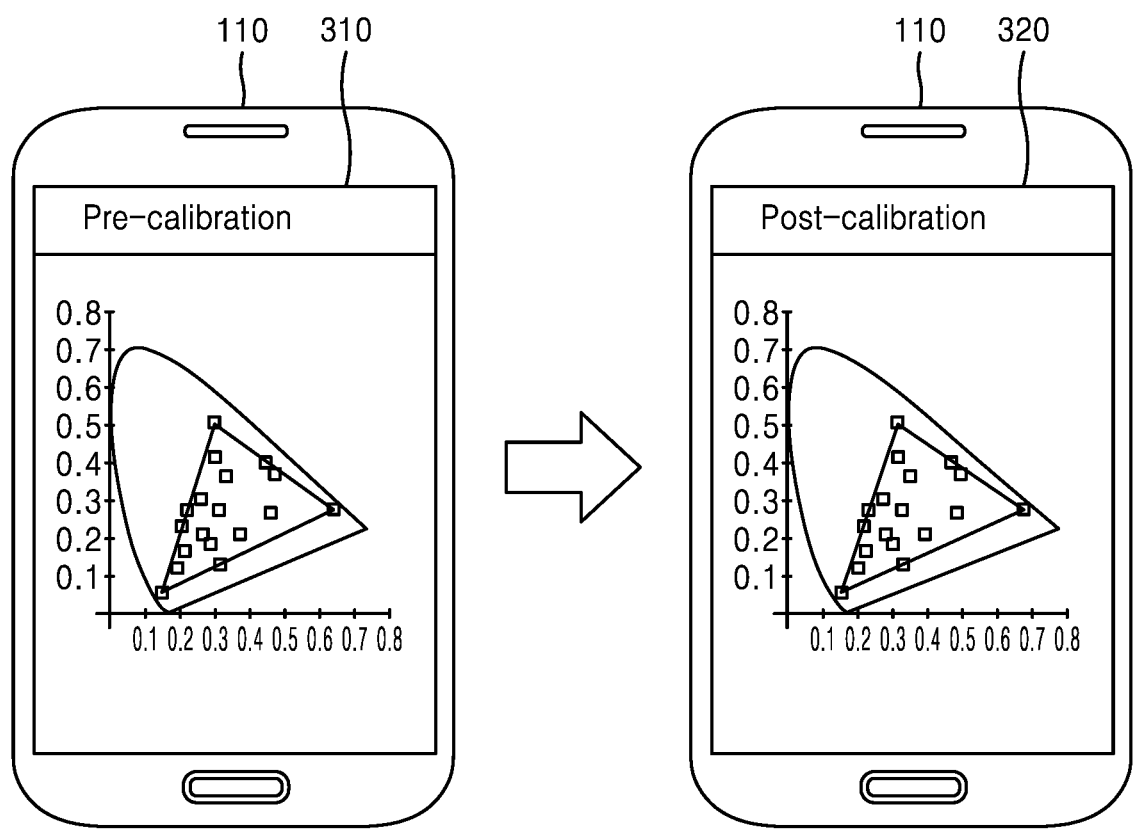
FIG. 3B is an illustrative diagram of a user interface (UI) screen displaying calibration data generated by the calibration system of FIG. 3A.

FIG. 3B is an illustrative diagram of a user interface (UI) screen displaying calibration data generated by the calibration system of FIG. 3A.

Referring to FIG. 3B, the electronic device 110 included in the calibration system of FIG. 3A may display UI screens 310 and 320 of the first application based on obtaining image information and wavelength information about the display device 120.

In an embodiment, the electronic device 110 may obtain image information and wavelength information about the display device 120 and display a first UI screen 310 including a first International Color Consortium (ICC) profile. In this case, the "first ICC profile" may refer to a data set in which characteristics displayed on the display device 120 are implemented before color calibration is performed on the display device 120.

For example, the first UI screen 310 including the first ICC profile may display data about a color gamut value, a white balance value, a color temperature value, a gamma value, a brightness value, and/or the like before color calibration is performed on the display device 120.

In an embodiment, the electronic device 110 may generate calibration data about the display device 120 and display a second UI screen 320 including a second ICC profile. In this case, the "second ICC profile" may refer to a data set in which characteristics displayed on the display device 120 are implemented after color calibration is performed on the display device 120.

For example, the second UI screen 320 including the second ICC profile may display data about a color gamut value, a white balance value, a color temperature value, a gamma value, a brightness value, and/or the like after color calibration is performed on the display device 120 or on which color calibration is to be performed.

Figure 4:
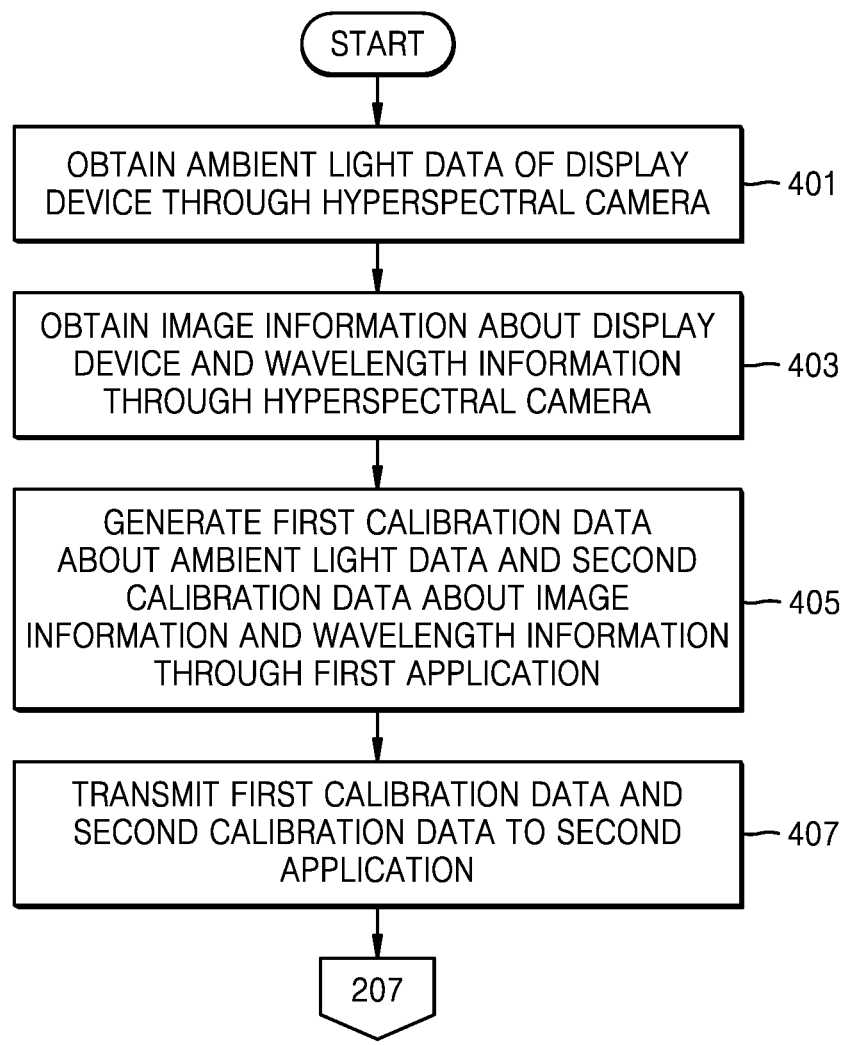
FIG. 4 is a flowchart for describing an operating method of a calibration system according to another embodiment.
Figure 5:
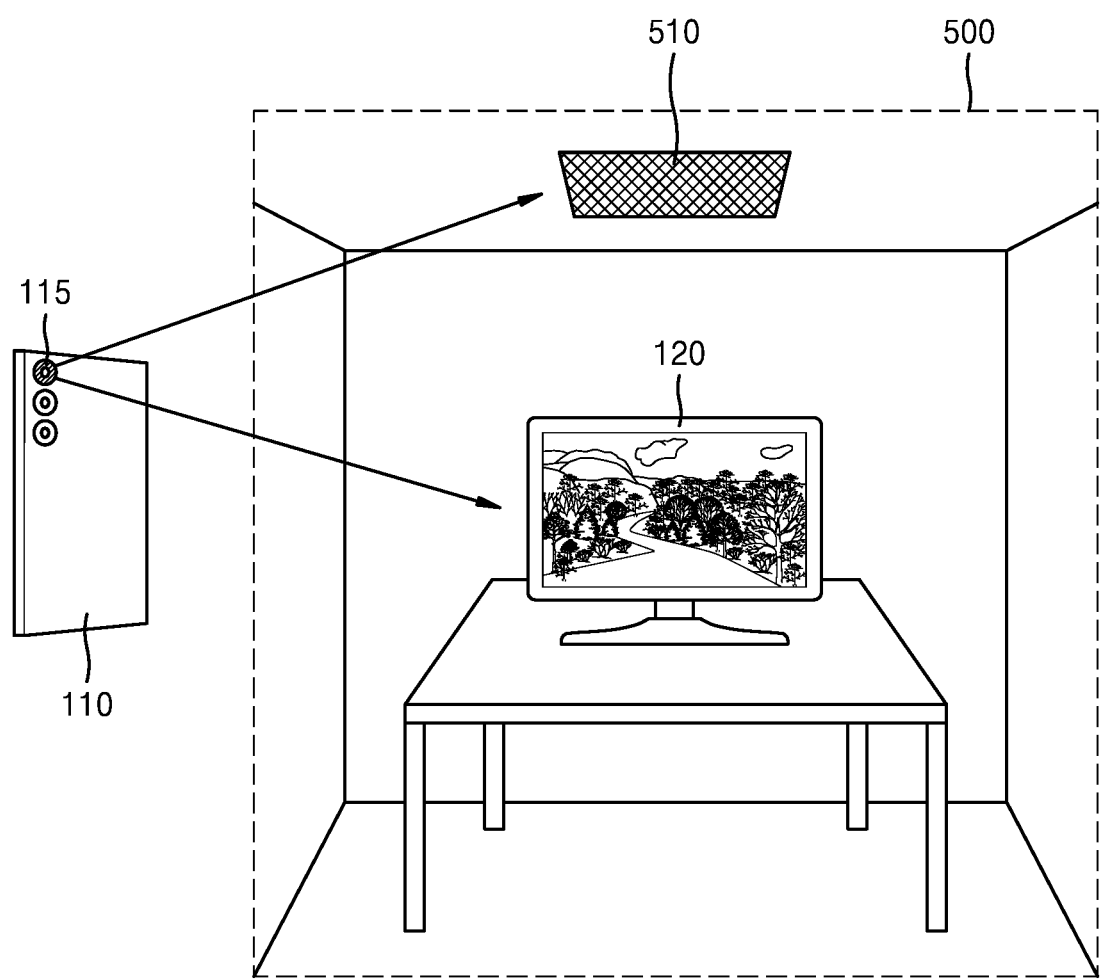
FIG. 5 is a conceptual diagram illustrating an operation of the calibration operating method of FIG. 4.

FIG. 4 is a flowchart for describing an operating method of a calibration system according to another embodiment. FIG. 5 is a conceptual diagram illustrating an operation of the calibration system of FIG. 4. In the description of FIGS. 4 and 5, redundant descriptions with those provided above may be omitted for conciseness.

FIG. 4 illustrates operations performed by an electronic device (e.g., the electronic device 110 of FIG. 1) and a display device (e.g., the display device 120 of FIG. 1) included in a calibration system (e.g., the calibration system 100 of FIG. 1).

Referring to FIG. 4, in operation 401, the electronic device 110 of the calibration system 100 may obtain ambient light data of the display device 120 through a hyperspectral camera (e.g., the hyperspectral camera 115 of FIG. 1). In this case, the "ambient light data" may refer to information about a light installed in a space where the display device 120 is arranged.

In an embodiment, the electronic device 110 may obtain illuminance information and color information about an ambient operation environment by activating the hyperspectral camera 115. In this case, the ambient operation environment may refer to an environment in which a particular light is installed, and the particular light may include incandescent lamps, fluorescent lamps, and/or LED lamps having various illuminances and color temperatures. However, the disclosure is not limited thereto, and the ambient operation environment may refer to an environment in which no light is installed, such as a dark room.

Referring to FIG. 5, the electronic device 110 may obtain, through the hyperspectral camera 115, illuminance information and color information of an ambient light 510 installed in a space 500 where the display device 120 is arranged.

For example, when the user holds the electronic device 110 such that a camera portion of the electronic device 110 may face the ambient light 510, the electronic device 110 may obtain an illuminance of 100 lux and a color temperature of 2,700 K of the ambient light 510 through the hyperspectral camera 115. In this case, the ambient operation environment of the display device 120 may refer to an environment in which a bright and yellow light is installed.

As another example, when the user holds the electronic device 110 such that a camera portion of the electronic device 110 may face the ambient light 510, the electronic device 110 may obtain an illuminance of 250 lux and a color temperature of 6,000 K of the ambient light 510 through the hyperspectral camera 115. In this case, the ambient operation environment of the display device 120 may refer to an environment in which a bright and white light is installed.

In an embodiment, in operation 403, the electronic device 110 of the calibration system 100 may obtain image information about the display device 120 and wavelength information about each pixel through the hyperspectral camera 115.

In an embodiment, the electronic device 110 may obtain image information about the display device 120 and wavelength information about each pixel by activating the hyperspectral camera 115. In this case, the display device 120 may display an image in which a plurality of images including a single color appear continuously or may display only a single image including a plurality of colors; however, the disclosure is not limited thereto.

According to an embodiment, in operation 405, the electronic device 110 of the calibration system 100 may generate first calibration data about the ambient light data and second calibration data about the image information and wavelength information through the first application.

In an embodiment, the electronic device 110 may generate first calibration data through the first application based on the obtained ambient light data. In this case, through the first application, the electronic device 110 may calculate a color temperature value, a brightness value, and/or the like based on the wavelength information about each pixel included in the image information captured with respect to the ambient light 510. For example, through the first application, the electronic device 110 may calculate a color temperature value of 6,000 K and an illuminance value of 250 lux of the ambient light 510 captured through the hyperspectral camera 115.

In an embodiment, the electronic device 110 may generate first calibration data by comparing the value about the ambient light 510 calculated through the first application with a preset first standard value. In this case, the "preset first standard value" may refer to a standard value adjusted by the user in relation to the ambient operation environment of the display device 120, a finally set standard value, or a standard value preset by the manufacturer; however, the disclosure is not limited thereto.

For example, the first standard value preset for the ambient light 510 may include a color temperature value of 4,700 K and an illuminance value of 150 lux, and the electronic device 110 may generate first calibration data such as "−1,300 K" and "−100 lux" for a color temperature item and an illuminance item respectively by comparing the value about the ambient light 510 calculated through the first application with the preset first standard value.

In an embodiment, the electronic device 110 may generate second calibration data through the first application based on the obtained image information and wavelength information. In this case, through the first application, the electronic device 110 may calculate a color gamut value, a gamma value, a color temperature value, a brightness value, a color fidelity value, a white balance value, and/or the like based on the wavelength information about each pixel included in the image information. For example, through the first application, the electronic device 110 may calculate a color gamut value of 98.5%, a gamma value of 2.1, a color temperature value of 6,680 K, and a brightness value of 149 cd/m$^2$ of the display screen of the display device 120 photographed (captured) through the hyperspectral camera 115.

In an embodiment, the electronic device 110 may generate second calibration data by comparing the measurement value calculated through the first application with a preset second standard value. In this case, the "preset second standard value" may refer to a standard value adjusted by the user in relation to display color calibration of the display device 120, a finally set standard value (e.g., a value set one month ago), or a standard value preset by the manufacturer; however, the disclosure is not limited thereto.

For example, a preset standard value for the display screen of the display device 120 may include a color gamut value of 100.5%, a gamma value of 2.2, a color temperature value of 6,500 K, and a brightness value of 120 cd/m$^2$, and the electronic device 110 may generate second calculation data such as "+2%", "+0.1", "−180 K", and "−29 cd/m$^2$" for a color gamut item, a gamma item, a color temperature item, and a brightness item respectively by comparing the measurement value calculated through the first application with the preset standard value.

According to an embodiment, in operation 407, the electronic device 110 of the calibration system 100 may transmit the first calibration data and the second calibration data to the second application in the electronic device 120. Thereafter, the calibration system 100 may perform operation 207 of FIG. 2 and subsequent operations.

Figure 6:
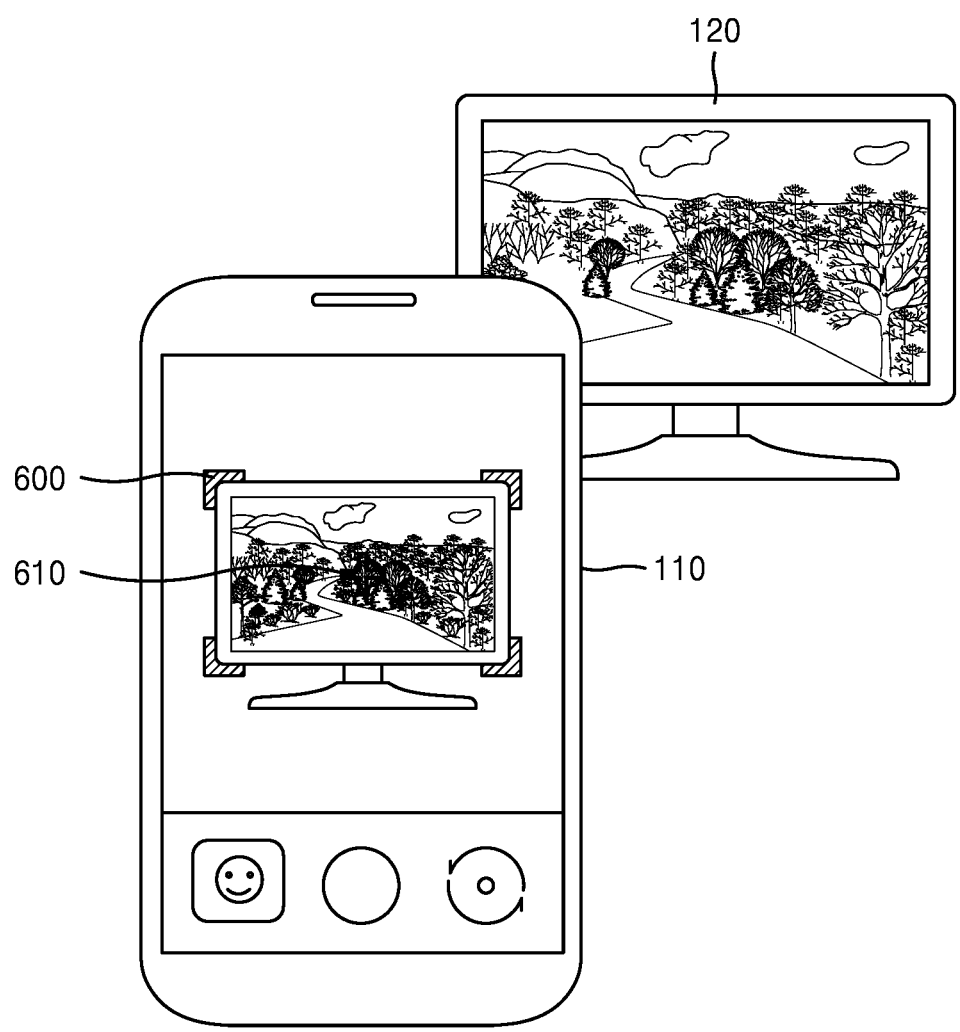
FIG. 6 is an illustrative diagram for describing a method by which an electronic device obtains image information, according to an embodiment.

FIG. 6 is an illustrative diagram for describing a method by which an electronic device obtains image information, according to an embodiment.

Referring to FIG. 6, the electronic device 110 of the calibration system (e.g., the calibration system 100 of FIG. 1) may perform an autofocus (AF) function of automatically focusing on the display panel of the display device 120 to obtain image information.

In an embodiment, the electronic device 110 may perform an autofocus function by a contrast detection AF method. For example, the electronic device 110 may focus by repeatedly moving a lens until a contrast value of light input through the hyperspectral camera (e.g., the hyperspectral camera 115 of FIG. 1) is maximum.

In another embodiment, the electronic device 110 may perform an autofocus function by a phase difference detection AF method. For example, the electronic device 110 may generate two images through an AF detection sensor based on image information of a subject input through the hyperspectral camera 115 and focus by adjusting the distance between two images formed on an image forming surface.

However, the autofocus method of the electronic device 110 is not limited thereto, and in other embodiments, the electronic device 110 may perform an autofocus function by a hybrid AF method or by a dual pixel CMOS AF method.

In an embodiment, when automatically focusing on the display panel of the display device 120, the electronic device 110 may display objects 600 and 610 tracking the display panel on a UI screen. For example, the electronic device 110 may visually track the display panel by displaying a first object 600 in each area corresponding to each of four vertexes of the display panel of the display device 120 and displaying a second object 610 in an area corresponding to the center of the display panel.

Figure 7A:
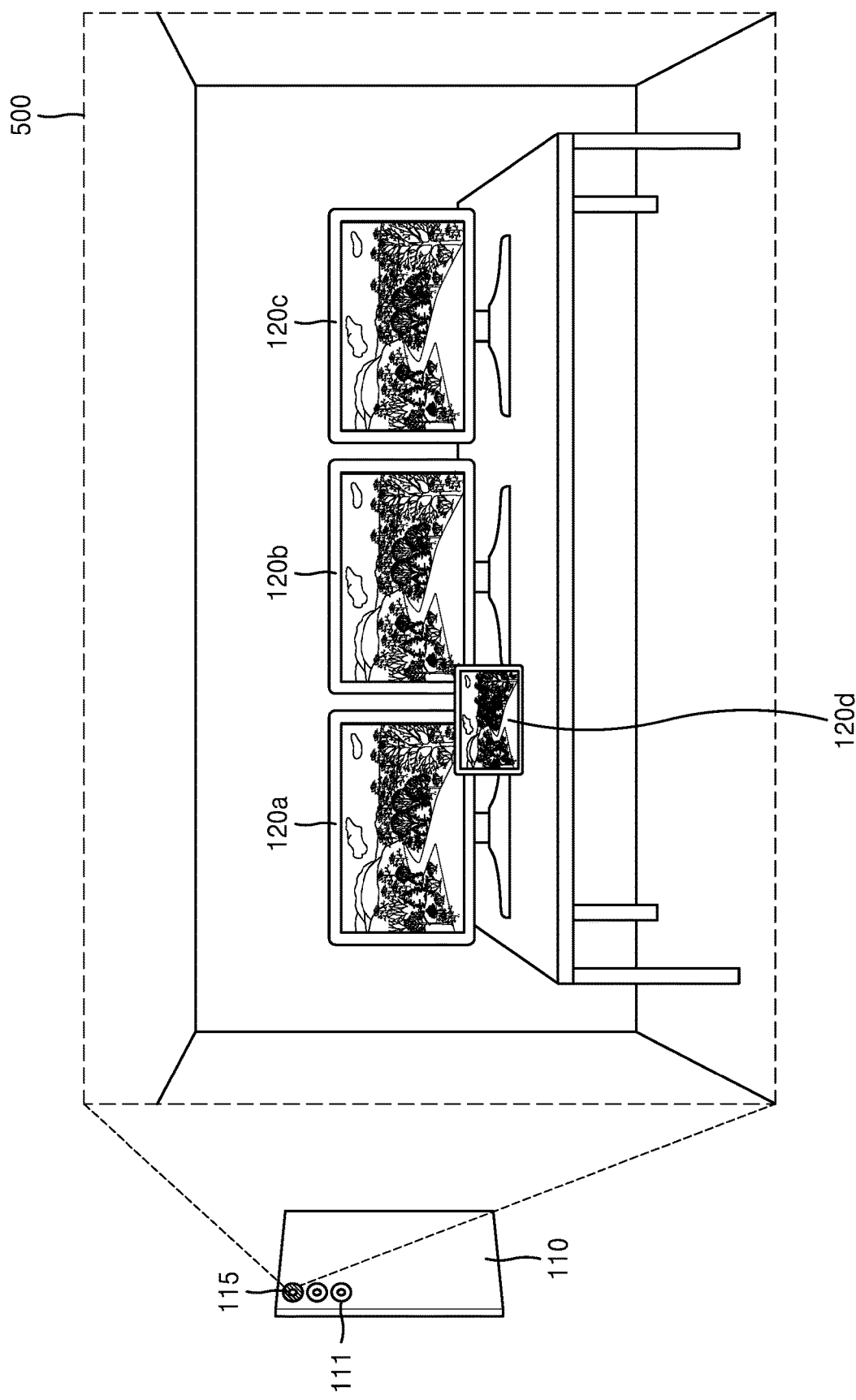
FIG. 7A is a conceptual diagram illustrating an operation of a calibration system according to another embodiment.
Figure 7B:
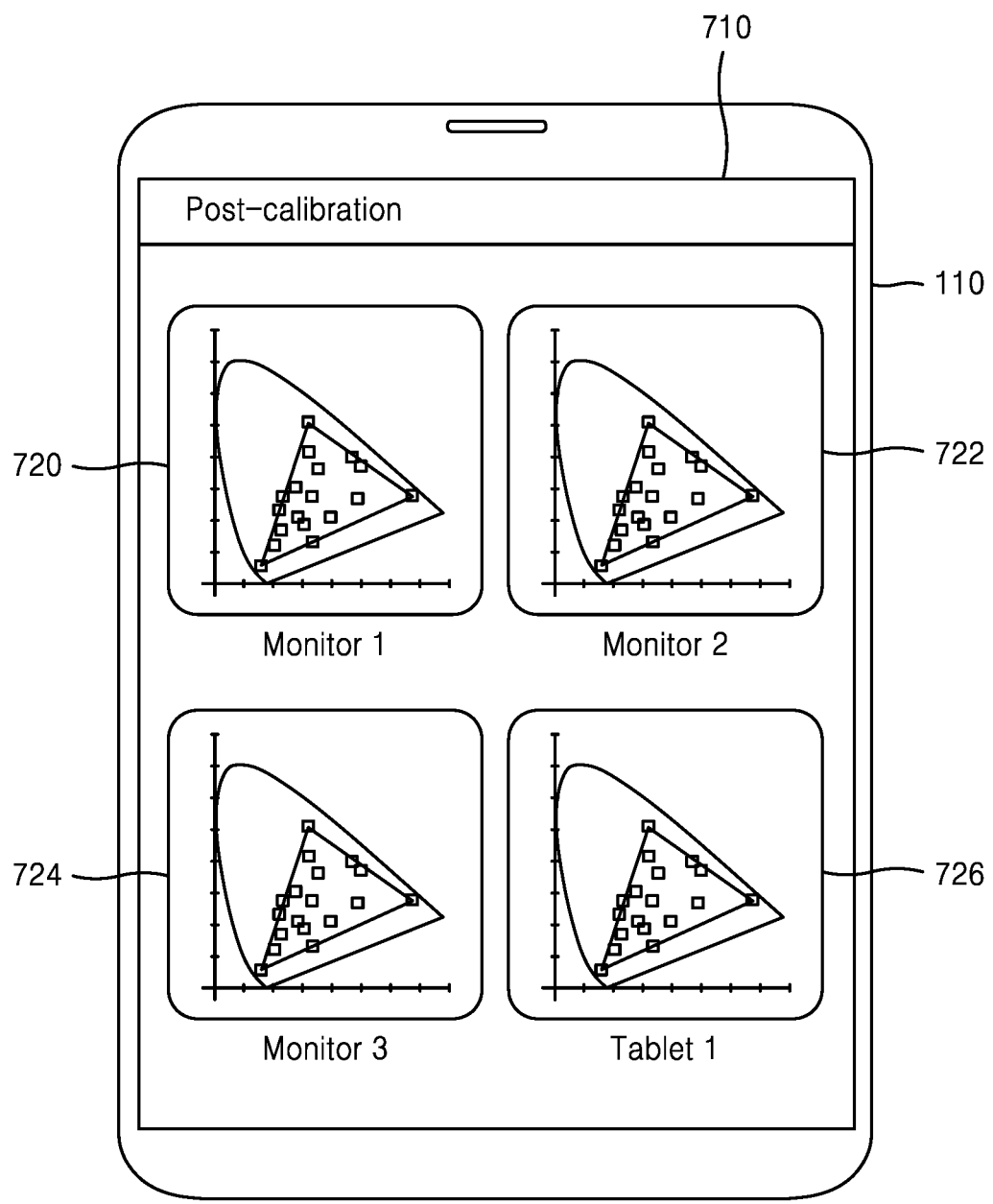
FIG. 7B is an illustrative diagram of a UI screen displaying calibration data generated by the calibration system of FIG. 7A.

FIG. 7A is a conceptual diagram illustrating an operation of a calibration system according to another embodiment. FIG. 7B is an illustrative diagram of a UI screen displaying calibration data generated by the calibration system of FIG. 7A.

Referring to FIG. 7A, when a plurality of display devices 120a, 120b, 120c, and 120d are located within the field-of-view (FOV) of the hyperspectral camera 115, the electronic device 110 may obtain (or capture) image information displayed on the plurality of display devices 120a, 120b, 120c, and 120d. For example, when the plurality of display devices 120a, 120b, 120c, and 120d are located within the FOV photographed (captured) by the hyperspectral camera 115, the electronic device 110 may obtain image information and wavelength information about each pixel by capturing image information displayed on the plurality of display devices 120a, 120b, 120c, and 120d.

In this case, the plurality of display devices 120a, 120b, 120c, and 120d may include not only a TV and a monitor connected to a PC, but also a tablet PC and a smart phone. For example, among the plurality of display devices 120a, 120b, 120c, and 120d, some display devices 120a, 120b, and 120c may correspond to a monitor connected to a PC and the other display device 120d may correspond to a tablet PC.

In an embodiment, the electronic device 110 may calculate the color information of the panels of the plurality of display devices 120a, 120b, 120c, and 120d through the color calibration application based on the obtained image information and wavelength information about each pixel. Also, the electronic device 110 may receive a preset standard value for the plurality of display devices 120a, 120b, 120c, and 120d. Thereafter, the electronic device 110 may generate a plurality of pieces of calibration data by comparing the value calculated with respect to the color information of the panels of the plurality of display devices 120a, 120b, 120c, and 120d with the preset standard value.

For example, referring to FIG. 7B, the electronic device 110 may display a UI screen 710 including the plurality of pieces of calibration data generated for the plurality of display devices 120a, 120b, 120c, and 120d. In this case, the UI screen 710 may include an ICC profile 720 for a first display device 120a, an ICC profile 722 for a second display device 120b, an ICC profile 724 for a third display device 120c, and an ICC profile 726 for a fourth display device 120d.

Moreover, the method described above may be recorded on a non-transitory computer-readable recording medium on which one or more programs including instructions for executing the method are recorded. Examples of the computer-readable recording medium include magnetic media such as hard disks, floppy disks, and magnetic tapes, optical media such as CD-ROMs and DVDs, magneto-optical media such as floptical disks, and hardware devices such as ROMs, RAMs, and flash memories that are specially configured to store and execute program instructions. Examples of the program instructions include not only machine language codes such as those generated by compilers, but also high-level language codes that may be executed by computers by using interpreters or the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An operating method of a calibration system for a display device, the operating method comprising:
    obtaining image information of an image displayed on a screen of the display device;
    obtaining wavelength information about pixels of the image information using a hyperspectral camera included in an electronic device;
    transmitting the obtained image information and wavelength information to a first application in the electronic device;
    generating calibration data about the obtained image information and wavelength information through the first application and transmitting the calibration data to a second application in the display device; and
    performing color calibration of the display device based on the calibration data transmitted to the second application to provide a color calibrated output image on the display device.

2. The operating method of claim 1, wherein the first application of the electronic device generates calibration data by measuring at least one of color gamut and color fidelity based on the obtained image information and wavelength information.

3. The operating method of claim 2, wherein the first application of the electronic device generates calibration data by further measuring at least one of white balance, corrected color temperature, brightness, and gamma.

4. The operating method of claim 1, further comprising obtaining ambient light data of the display device through the hyperspectral camera, wherein the display device outputs color calibrated output image further adjusted for the ambient light.

5. The operating method of claim 4, further comprising:
    transmitting the obtained ambient light data to the first application in the electronic device;
    generating first calibration data about the ambient light data and second calibration data about the obtained image information and wavelength information through the first application; and
    transmitting the first calibration data and the second calibration data to the second application.

6. The operating method of claim 1, wherein the obtaining of the image information comprises setting autofocus on a certain area of the display device through the hyperspectral camera.

7. The operating method of claim 1, further comprising:
    obtaining a plurality of pieces of image information and wavelength information about a plurality of display devices through the hyperspectral camera; and
    generating a plurality of pieces of calibration data respectively corresponding to the plurality of display devices by analyzing the plurality of pieces of image information and wavelength information through the first application.

8. The operating method of claim 1, wherein the first application of the electronic device and the second application of the display device each establish a wireless communication connection through a server.

9. The operating method of claim 1, wherein generating the calibration data comprises generating a hyperspectral cube having a plurality of channel information at each spatial coordinate of respective pixels of the image information, and the plurality of channel information corresponds to the wavelength information of the pixels of the image information at respective spatial coordinates of the image information.

10. The operating method of claim 1, wherein the hyperspectral camera obtains the wavelength information and a general camera obtains the image information.

11. A non-transitory computer-readable recording medium having recorded thereon a program for executing the operating method of claim 1 in a computer.

12. A calibration system for a display device, the calibration system comprising:
    an electronic device comprising a hyperspectral camera; and
    a display device,
    wherein the electronic device includes a processor, and the processor is configured to
    obtain image information about an image displayed on the display device;
    obtain wavelength information about pixels of the image information through the hyperspectral camera,
    transmit the obtained image information and wavelength information to a first application, and
    generate calibration data about the obtained image information and wavelength information through the first application and transmits the calibration data to a second application in the display device, and
    the display device is configured to perform color calibration of the display device based on the calibration data transmitted to the second application to provide a color calibrated output image on the display device.

13. The calibration system of claim 12, wherein the first application of the electronic device is configured to generate calibration data by measuring at least one of color gamut and color fidelity based on the obtained image information and wavelength information.

14. The calibration system of claim 13, wherein the first application of the electronic device is further configured to generate calibration data by further measuring at least one of white balance, corrected color temperature, brightness, and gamma.

15. The calibration system of claim 12, wherein the electronic device is further configured to obtain ambient light data of the display device through the hyperspectral camera, and the display device outputs color calibrated output image further adjusted based on the ambient light.

16. The calibration system of claim 15, wherein the electronic device is further configured to
    transmit the obtained ambient light data to the first application,
    generate first calibration data about the ambient light data and second calibration data about the obtained image information and wavelength information through the first application, and
    transmit the first calibration data and the second calibration data to the second application.

17. The calibration system of claim 12, wherein the electronic device is further configured to set autofocus on a certain area of the display device through the hyperspectral camera.

18. The calibration system of claim 12, wherein the electronic device is further configured to
    obtain a plurality of pieces of image information and wavelength information about a plurality of display devices through the hyperspectral camera, and
    generate a plurality of pieces of calibration data respectively corresponding to the plurality of display devices by analyzing the plurality of pieces of image information and wavelength information through the first application.

19. The calibration system of claim 12, wherein the first application of the electronic device and the second application of the display device are each configured to establish a wireless communication connection through a server.

20. The calibration system of claim 12, wherein the processor generates the calibration data by generating a hyperspectral cube having a plurality of channel information at each spatial coordinate of respective pixels of the image information, and the plurality of channel information corresponds to the wavelength information of the pixels of the image information at respective spatial coordinates of the image information.

* * * * *